United States Patent
McGee et al.

(10) Patent No.: US 7,110,047 B2
(45) Date of Patent: Sep. 19, 2006

(54) SIGNIFICANT SCENE DETECTION AND FRAME FILTERING FOR A VISUAL INDEXING SYSTEM USING DYNAMIC THRESHOLDS

(75) Inventors: Thomas McGee, Garrison, NY (US); Nevenka Dimitrova, Yorktown Heights, NY (US); Jan Herman Elenbaas, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 488 days.

(21) Appl. No.: 10/298,968

(22) Filed: Nov. 18, 2002

(65) Prior Publication Data
US 2003/0090505 A1    May 15, 2003

Related U.S. Application Data

(63) Continuation of application No. 09/433,258, filed on Nov. 4, 1999, now Pat. No. 6,496,228.

(51) Int. Cl.
*H04N 5/14*    (2006.01)
(52) U.S. Cl. .................................. 348/700; 348/701
(58) Field of Classification Search ............... 348/200, 348/155, 699, 701; 382/107, 190, 224, 228; 729/38, 39, 61; 715/723
See application file for complete search history.

(56) References Cited

U.S. PATENT DOCUMENTS

| | | | | | |
|---|---|---|---|---|---|
| 5,267,334 A | * | 11/1993 | Normille et al. | ............ | 382/236 |
| 5,379,044 A | * | 1/1995 | Carlson et al. | ............... | 342/90 |
| 5,404,316 A | * | 4/1995 | Klingler et al. | ............. | 715/723 |
| 5,428,774 A | * | 6/1995 | Takahashi et al. | .......... | 707/101 |
| 5,682,326 A | * | 10/1997 | Klingler et al. | .......... | 715/500.1 |
| 5,724,475 A | * | 3/1998 | Kirsten | ....................... | 386/109 |
| 5,751,378 A | * | 5/1998 | Chen et al. | ................. | 348/700 |
| 5,754,700 A | * | 5/1998 | Kuzma | ....................... | 382/236 |
| 6,041,142 A | * | 3/2000 | Rao et al. | .................... | 382/232 |
| 6,130,707 A | * | 10/2000 | Koller et al. | ............... | 348/155 |

* cited by examiner

*Primary Examiner*—Victor R. Kostak

(57) ABSTRACT

A video indexing system analyzes contents of source video and develops a visual table of contents using selected images. A system for detecting significant scenes detects video cuts from one scene to another, and static scenes based on DCT coefficients and macroblocks. A keyframe filtering process filters out less desired frames including, for example, unicolor frames, or those frames having a same object as a primary focus or one primary focuses. Commercials may also be detected and frames of commercials eliminated. The significant scenes and static scenes are detected based on a threshold which is set based on the category of the video.

7 Claims, 10 Drawing Sheets

SIGNIFICANT SCENE DETECTION AND FRAME FILTERING FOR A VISUAL INDEXING SYSTEM USING DYNAMIC THRESHOLDS

This is a continuation of application Ser. No. 09/433,258 filed Nov. 4, 1999 now U.S. Pat. No. 6,496,228.

BACKGROUND OF THE INVENTION

The present invention is related to an apparatus which detects significant scenes of a source video and selects keyframes to represent each detected significant scene. The present invention additionally filters the selected keyframes and creates a visual index or a visual table of contents based on remaining keyframes.

Users will often record home videos or record television programs, movies, concerts, sports events, etc. on a tape for later or repeated viewing. Often, a video will have varied content or be of great length. However, a user may not write down what is on a recorded tape and may not remember what she recorded on a tape, DVD or other medium or where on a tape particular scenes, movies, or events are recorded. Thus, a user may have to sit and view an entire tape to remember what is on the tape.

Video content analysis uses automatic and semi-automatic methods to extract information that describes contents of the recorded material. Video content indexing and analysis extracts structure and meaning from visual cues in the video. Generally, a video clip is taken from a TV program or a home video.

In U.S. Ser. No. PHA 23252, of which the present application is a continuation in part thereof, a method and device is described which detects scene changes or "cuts" in the video. At least one frame between detected cuts is then selected as a key frame to create a video index. In order to detect scene changes a first frame is selected and then a subsequent frame is compared to the first frame and a difference calculation is made which represents the content difference between the two frames. The result of this difference calculation is then compared to a universal threshold or thresholds which is/are used for all categories of video. If the difference is above the universal threshold(s) it is determined that a scene change has occurred.

In PHA 23252 a universal threshold(s) is/are chosen which is/are optimal for all types of video. The problem with such an application is that a visual index of a video which contains high action, such as an action movie, will be quite large, whereas a visual index of a video with little action, such as the news will be quite small. This is because in a high action movie, where objects are moving across a scene, the content difference between two consecutive frames may be large. In such a case, comparing the content difference to a universal threshold will result in a "cut" being detected even though the two frames may be within the same scene. If there are more perceived cuts or scene changes then there will be more key frames and vice versa. Accordingly an action movie ends up having far too many key frames to represent the movie.

SUMMARY OF THE PRESENT INVENTION

Accordingly it is an object of the invention to provide a system which will create a visual index for a video source which was previously recorded or while being recorded, which is useable and more accurate in selecting significant keyframes by varying the number of keyframes chosen from a video based on the category of the video.

The present invention further presents a video analysis system supporting visual content extraction for source video which may include informative and/or entertainment programs such as news, serials, weather, sports or any type of home recorded video, broadcast material, prerecorded material etc.

The present invention further presents a new apparatus for video cut detection, static scene detection, and keyframe filtering to provide for more useable visual images in the visual index by comparing two frames of video and determining whether the differences between the frames are above or below a certain threshold, the threshold being dependent on the category of the video. If the differences are above the selected threshold then this point in the video is determined to be a scene "cut". The frames within the scene cuts can then be filtered to select key frames for a video index. If the differences are below a static scene threshold for a number of frames it is determined to be a static sequence.

The present invention may detect significant scenes and select keyframes of source video, based on calculations using DCT coefficients and comparisons to various thresholds where the thresholds vary based on the category of video, e.g. action, news, music, or even the category of portions of a video.

Additionally it is an object of the invention to calculate these thresholds based on a video category provided by electronic program guides, or alternatively instead of calculating the thresholds the electronic program guide provides the thresholds themselves.

Furthermore it is an object of the invention to enter these thresholds manually.

It is even another object of the invention to provide the thresholds in the encoded video.

For a better understanding of the invention, its operating advantages and specific objects attained by its use, reference should be had to the accompanying drawings and descriptive matter in which there are illustrated and described the preferred embodiments of the invention.

DESCRIPTION OF THE PREFERRED EMBODIMENTS

The Basic Operation of a Visual Indexing System is First Explained:

A visual index may be created on a pre-existing tape (or file, DVD, disks, etc.) or while recording on a new tape. For both tapes a predetermined portion at a selected area on the tape (if available), in this example, the beginning for ease of use, to allow a visual index to be created or the index could be stored on an entirely different medium such as a hard disk etc. For the present example, thirty seconds of "blank" or overwrittable tape is desired. For a file, the selected area for the visual index may occur anywhere in the file, and may be reserved by a system automatically or manually selected by a user.

The visual index may include visual images, audio, text or any combination thereof. For the present example, visual images and text are provided. To create and use the visual index, a video content indexing process is performed.

Two phases exist in the video content indexing process: archival and retrieval. During the archival process, video content is analyzed during a video analysis process and a visual index is created. In the video analysis process, automatic significant scene detection and keyframe selection occur. Significant scene detection is a process of identifying scene changes, i.e., "cuts" (video cut detection or segmentation detection) and identifying static scenes (static scene detection). For each scene, a particular representative frame called a keyframe is extracted. A keyframe filtering and selection process is applied to each keyframe of source video, such as a video tape, to create a visual index from selectively chosen key frames. Reference is to a source tape although clearly, the source video may be from a file, disk, DVD, other storage means or directly from a transmission source (e.g., while recording a home video).

In video tape indexing, an index is generally stored on the source tape, CD etc. In video indexing an MPEG 1, MPEG 2, MPEG 4, Motion JPEG file or any other video file from a Video CD, DVD, or other storage device, or from a broadcast stream, the index may be stored on a hard disk, or other storage medium.

Figure 1:
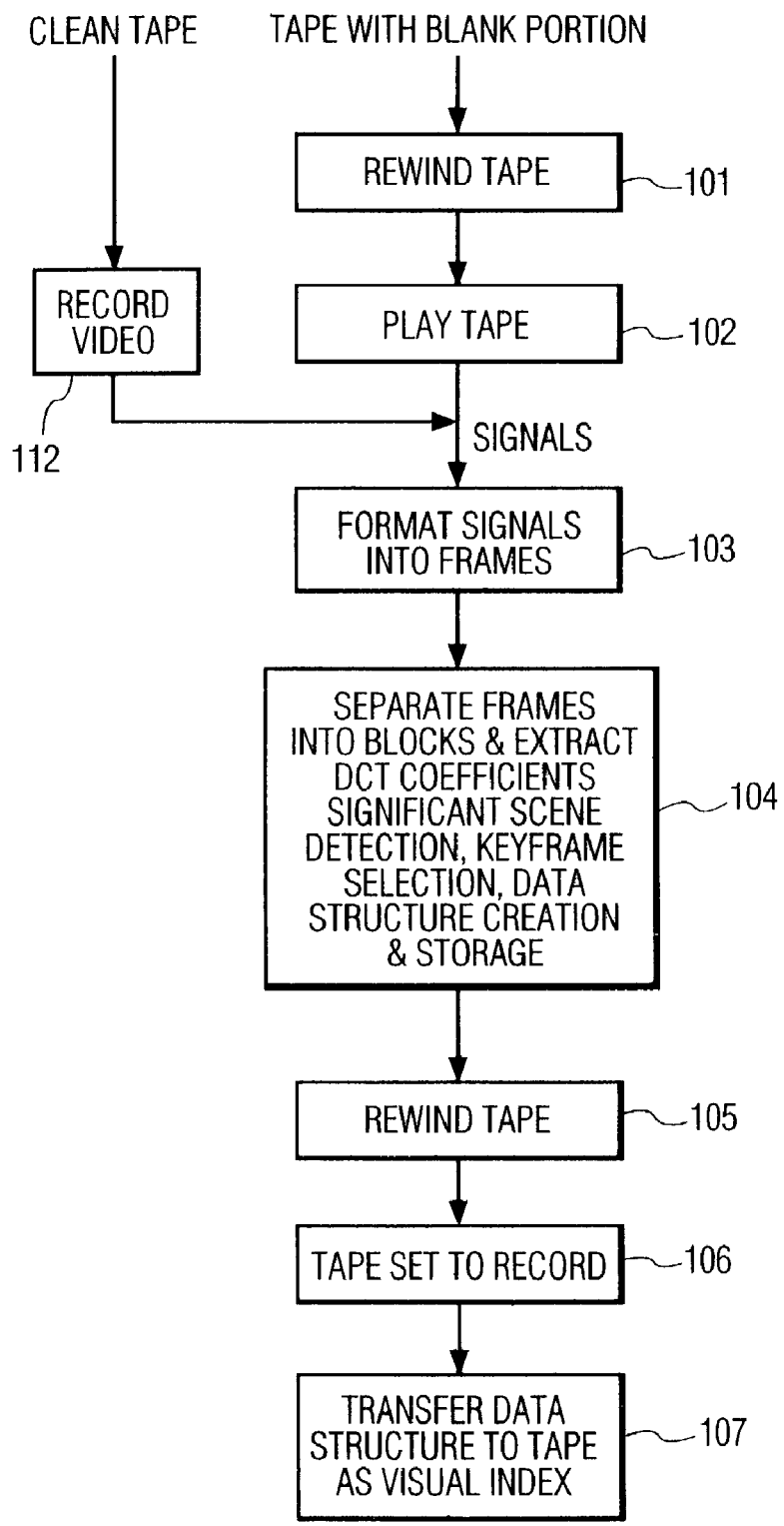
FIG. 1 illustrates a video archival process.

A video archival process is shown in FIG. 1 for a source tape with previously recorded source video, which may include audio and/or text, although a similar process may be followed for other storage devices with previously saved visual information, such as an MPEG file. In this process, a visual index is created based on the source video. A second process, for a source tape on which a user intends to record, creates a visual index simultaneously with the recording.

FIG. 1 illustrates an example of the first process (for previously recorded source tape) for a video tape. In step 101, the source video is rewound, if required, by a playback/recording device such as a VCR. In step 102, the source video is played back. Signals from the source video are received by a television, a VCR or other processing device. In step 103, a media processor in the processing device or an external processor, receives the video signals and formats the video signals into frames representing pixel data (frame grabbing).

In step 104, a host processor separates each frame into blocks, and transforms the blocks and their associated data to create DCT (discrete cosine transform) coefficients; performs significant scene detection and keyframe selection; and builds and stores keyframes as a data structure in a memory, disk or other storage medium. In step 105, the source tape is rewound to its beginning and in step 106, the source tape is set to record information. In step 107, the data structure is transferred from the memory to the source tape, creating the visual index. The tape may then be rewound to view the visual index.

The above process is slightly altered when a user wishes to create a visual index on a tape while recording. Instead of steps 101 and 102, as shown in step 112 of FIG. 1, the frame grabbing process of step 103 occurs as the video (film, etc.) is being recorded.

Additionally, if the tape, or file, is not completely recorded on at one time, a partially created video index could be saved on the tape, file, etc. or could be saved in a tape memory for later additions.

Figure 2A:
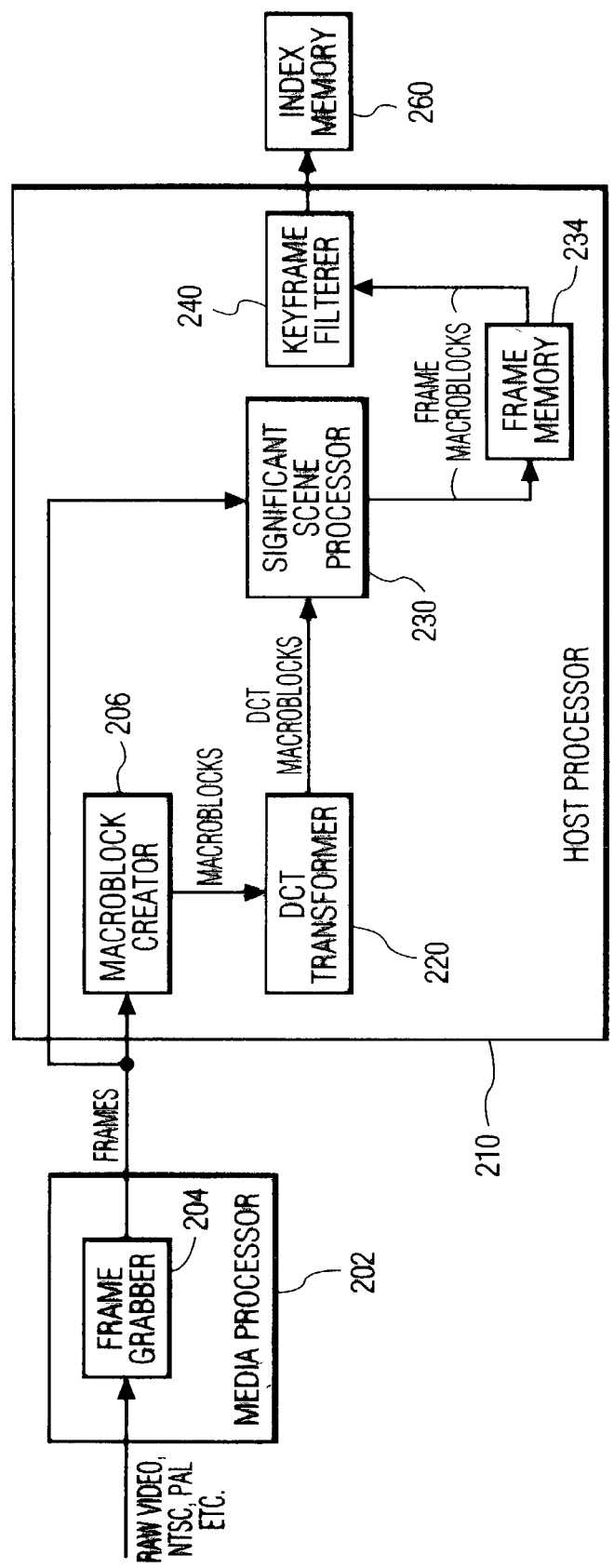
FIGS. 2A and 2B are block diagrams of devices used in creating a visual index.
Figure 2B:
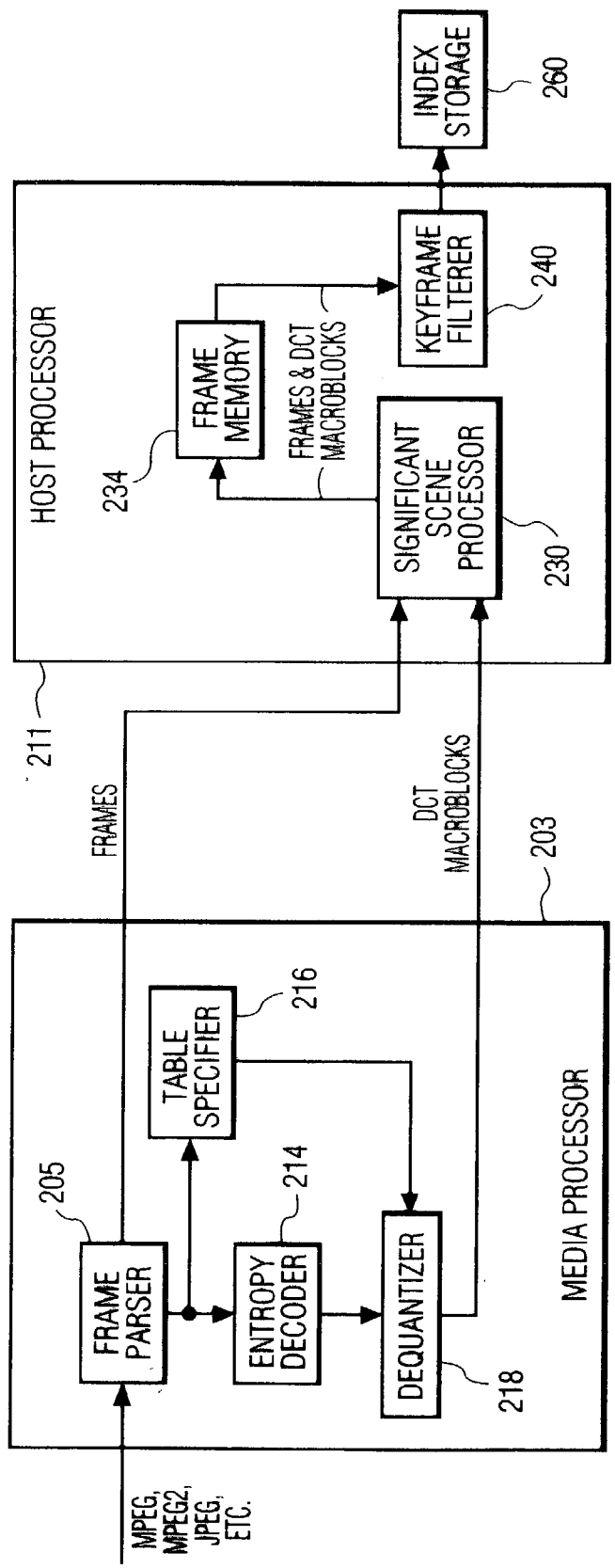

Steps 103 and 104 are more specifically illustrated in FIGS. 2A and 2B. Video exists either in analog (continuous data) or digital (discrete data) form. The present example operates in the digital domain and thus uses digital form for processing. The source video or video signal is thus a series of individual images or video frames displayed at a rate high enough (in this example 30 frames per second) so the displayed sequence of images appears as a continuous picture stream. These video frames may be uncompressed (NTSC or raw video) or compressed data in a format such as MPEG, MPEG 2, MPEG 4, Motion JPEG or such.

Figure 3:
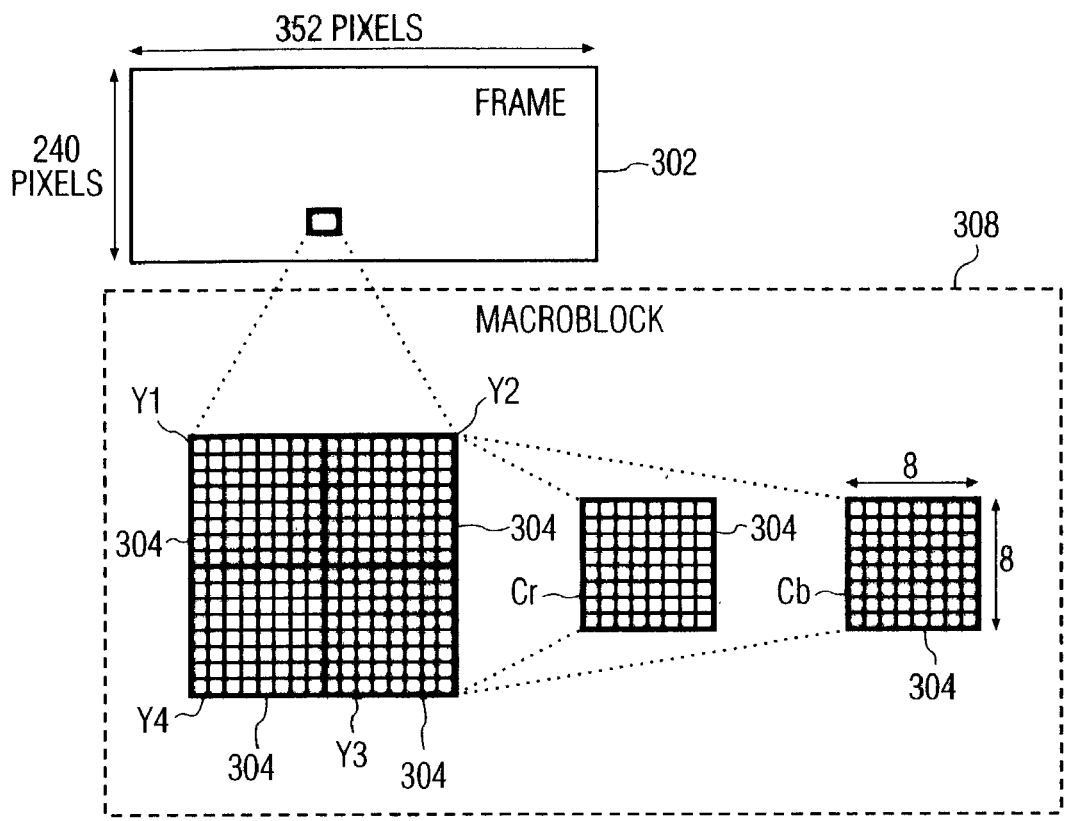
FIG. 3 illustrates a frame, a macroblock, and several blocks.

The information in an uncompressed video is first segmented into frames in a media processor 202, using a frame grabbing technique such as present on the Intel[7] Smart Video Recorder III. Although other frame sizes are available, in this example shown in FIG. 3, a frame 302 represents one television, video, or other visual image and includes 352× 240 pixels.

The frames 302 are each broken into blocks 304 of, in this example, 8×8 pixels in the host processor 210 (FIG. 2A). Using these blocks 304 and a popular broadcast standard, CCIR-601, a macroblock creator 206 (FIG. 2A) creates luminance blocks and averages color information to create chrominance blocks. The luminance and chrominance blocks form a macroblock 308. In this example, 4:2:0 is being used although other formats such as 4:1:1 and 4:2:2 could easily be used by one skilled in the art. In 4:2:0, a macroblock 308 has six blocks, four luminance, Y1, Y2, Y3, and Y4; and two chrominance Cr and Cb, each block within a macroblock being 8×8 pixels.

The video signal may also represent a compressed image using a compression standard such as Motion JPEG (Joint Photographic Experts Group) and MPEG (Motion Pictures Experts Group). If the signal is instead an MPEG or other compressed signal, as shown in FIG. 2B the MPEG signal is broken into frames using a frame or bitstream parsing technique by a frame parser 205. The frames are then sent to an entropy decoder 214 in the media processor 203 and to a table specifier 216. The entropy decoder 214 decodes the MPEG signal using data from the table specifier 216, using, for example, Huffman decoding, or another decoding technique.

The decoded signal is next supplied to a dequantizer 218 which dequantizes the decoded signal using data from the table specifier 216. Although shown as occurring in the media processor 203, these steps (steps 214–218) may occur in either the media processor 203, host processor 211 or even another external device depending upon the devices used.

Alternatively, if a system has encoding capability (in the media processor, for example) that allows access at different stages of the processing, the DCT coefficients could be delivered directly to the host processor. In all these approaches, processing may be performed in up to real time.

In step 104 of FIG. 1, the host processor 210, which may be, for example, an Intel7 Pentium™ chip or other multi-processor, a Philips7 Trimedia™ chip or any other multimedia processor; a computer; an enhanced VCR, record/playback device, or television; or any other processor, performs significant scene detection, key frame selection, and building and storing a data structure in an index memory, such as, for example, a hard disk, file, tape, DVD, or other storage medium.

Significant Scene Detection: For automatic significant scene detection, the present invention attempts to detect when a scene of a video has changed or a static scene has occurred. A scene may represent one or more related images. In significant scene detection, two consecutive frames are compared and, if the frames are determined to be significantly different, a scene change is determined to have occurred between the two frames; and if determined to be significantly alike, processing is performed to determine if a static scene has occurred. In a static type scene, such as a news broadcast, a lesser change between two frames may indicate a scene change. In the same action move the same change between two frames may not be a scene change but instead it may only be an object moving across the scene.

From each scene, one or more keyframes is extracted to represent the scene. Typically, current theory proposes using the first video (visual) frame in a scene. However, in many cases, the main subject or event in a scene appears after a camera zoom or pan. Additionally, current theories typically do not detect scenes that remain constant for some length of time (Static Scenes). However, based on the length of time spent on that scene, from a videographer=s, director=s, etc. point of view this may have been an important scene.

Figure 4:
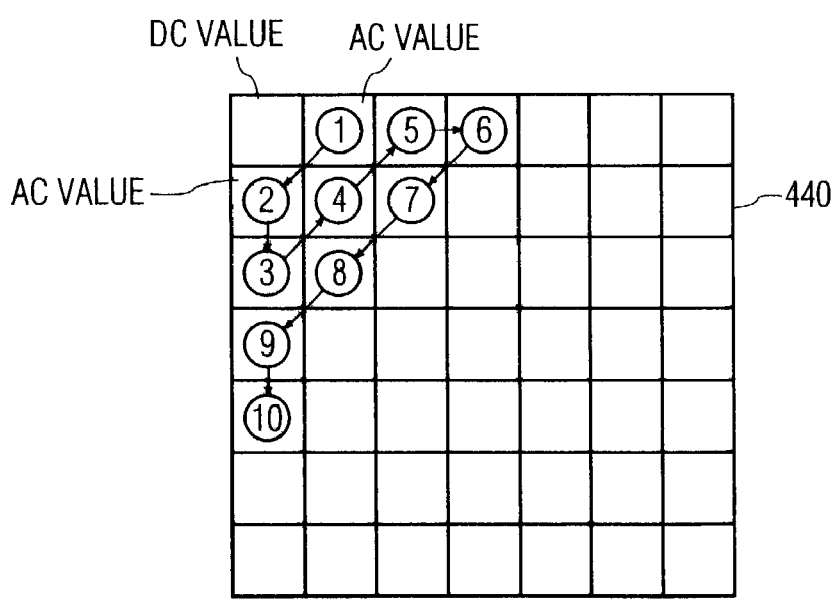
FIG. 4 illustrates several DCT coefficients of a block.

Each of the present methods uses comparisons of DCT (Discrete Cosine Transform) coefficients. There are other methods that can be used such as histogram differences, wavelets, comparisons based on pixels, edges, fractals, other DCT methods or any other method which uses thresholds to compare frames. First, each received frame 302 is processed individually in the host processor 210 to create macroblocks 308. The host processor 210 processes each macroblock 308 which contains spatial information, using a discrete cosine transformer 220 to extract DCT coefficients and create the six 8×8 blocks 440 (FIG. 4) of DCT coefficients.

When the video signal received is in compressed video format such as MPEG, the DCT coefficients may be extracted after dequantization and need not be processed by a discrete cosine transformer. Additionally, as previously discussed, DCT coefficients may be automatically extracted depending upon the devices used.

The DCT transformer provides each of the blocks 440 (FIG. 4), Y1, Y2, Y3, Y4, Cr and Cb with DCT coefficient values. According to this standard, the uppermost left hand corner of each block contains DC information (DC value) and the remaining DCT coefficients contain AC information (AC values). The AC values increase in frequency in a zig-zag order from the right of the DC value, to the DCT coefficient just beneath the DC value, as partially shown in FIG. 4.

The present invention may use several different significant scene detection methods, all of which use the DCT coefficients for the respective block. The host processor 210 further processes each of the macroblocks using at least one of the following methods in the significant scene processor 230 (FIG. 2A).

In the methods to follow, processing is limited to the DC values to more quickly produce results and limit processing without a significant loss in efficiency; however, clearly one skilled in the art could process all of the DCT coefficients for each of the macroblocks. By looping through each block using these steps, all the DCT coefficients could be analyzed, although this would affect time needed for processing.

Figure 5:
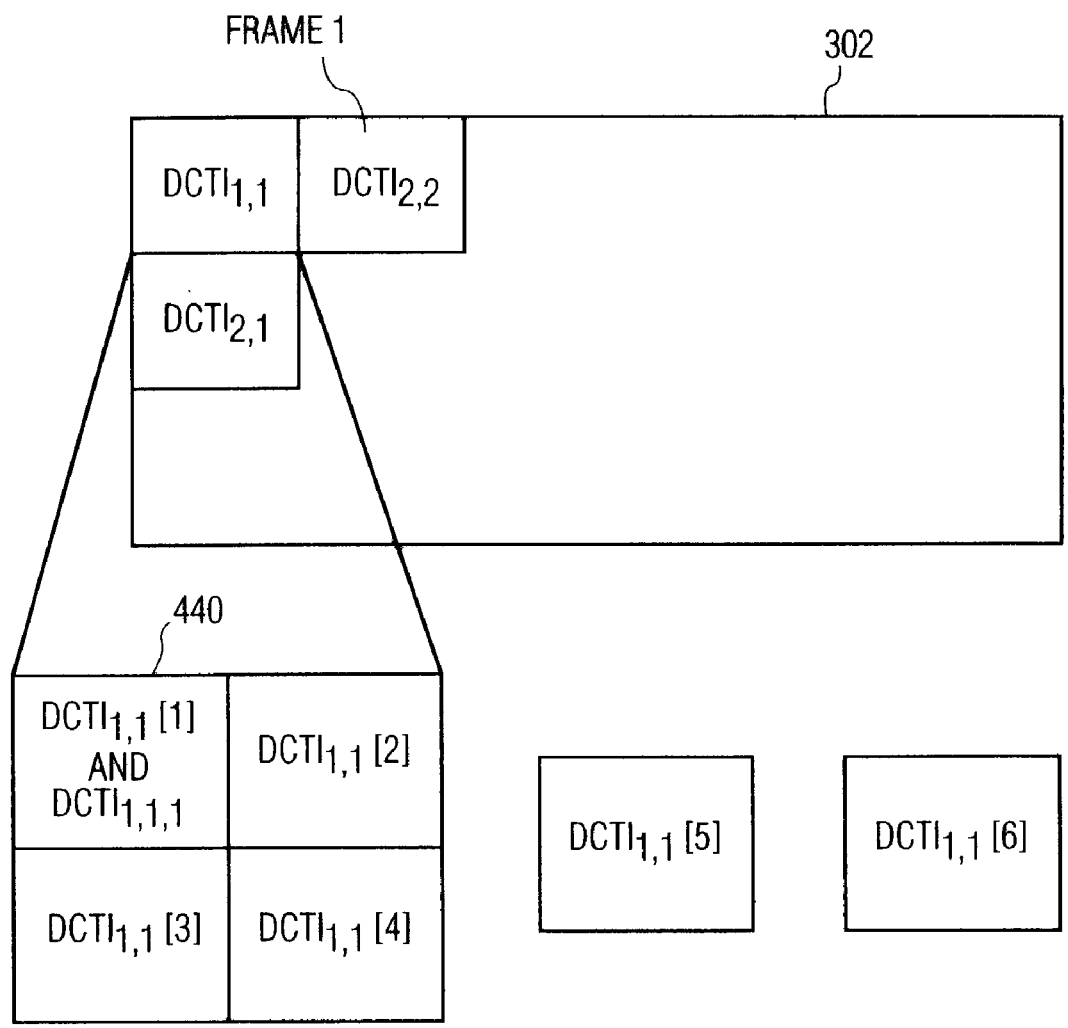
FIG. 5 illustrates a macroblock and several blocks with DCT coefficients.

Method One:

$$SUM[i] = 3_{k,j} ABS(DCT1_{k,j}[i] - DCT2_{k,j}[i])$$

where:

k is the number of macroblocks in width of a frame, k=1 to Frame-width/16, j is the number of macroblocks in height of a frame, j=1 to Frame-height/16, i is the number of blocks in a macroblock, i=1 to number of blocks in macroblock, $DCT1_{k,j}$ and $DCT2_{k,j}$ are DCT coefficients for the specified macroblock for a previous and a current video frame, respectively, as illustrated in FIG. 5 and ABS is an absolute value function.

In this example, for a 352×240 pixel frame, k=1 to 22, j=1 to 15, and i=1 to 6. In this method and the following methods, the macroblock width of a frame or the macroblock height of a frame will be an even integer, since if the frame sizes are not evenly divisible, the frame size is scaled to fit during processing.

Method one differentiates between each of the blocks (four luminance and two chrominance blocks) of the macroblocks. In this method, DC values for each luminance and chrominance block in a current macroblock from the current video frame are respectively subtracted from a corresponding DC value for a corresponding block in the previous video frame. Separate sums of differences, SUM [I], are kept for each luminance and chrominance block in the macroblock.

The sums of differences are carried forward to the next macroblock and added to the corresponding differences (SUM[1], SUM[2], . . . SUM[6]). After processing each of the macroblocks of the current video frame, a summed difference is obtained for each luminance block and each chrominance block of the current video frame. Each of the six SUMS is compared to its own upper and lower threshold specific to the type of block for which the SUM has been totaled. This method allows different threshold comparisons for each type of block.

If SUM[i] is greater than a predetermined threshold (thresh1[i]), in this example, where:

$$thresh1[i] = 0.3 * ABS(3_{k,j} DCT2_{k,j}[i]),$$

the current video frame is saved in a frame memory for further processing and possible use in the visual index. The frame memory may be a tape, a disk, as in the present invention, or any other storage medium, external or internal to the present system.

If SUM[i] is less than a predetermined threshold (thresh2 [i]), where:

$$thresh2[i] = 0.02 * ABS(3_{k,j} DCT2_{k,j}[i]),$$

a static scene counter (SSctr) is increased to indicate a possible static scene. The previous video frame is saved in a temporary memory. The temporary memory only saves one frame, thus, the previous video frame will replace any video frame currently stored in temporary memory. When the counter reaches a predetermined number, (in this example, 30) the most previous video frame saved in the temporary memory is transferred to the frame memory for possible use in the visual index. Although, it is described how the next to last frame is saved to possibly represent a static scene, clearly one skilled in the art could save and use a first frame of a possible static scene in this method and the following methods.

If SUM[i] is between the two thresholds, SSctr is reset to zero and the next consecutive frames are compared.

In accordance with the instant invention the threshold(s) is (are) varied based on the "cut rate" or the amount of action in the video. This is explained in the section below entitled: Determining The Threshold.

Method Two:

$$SUM = \sum_{k,j} \sum_i (DCT1_{k,j,i} - DCT2_{k,j,i})^2 / ABS(DCT2_{k,j,i})$$

k is the number of macroblocks in width of a frame, k = 1 to Frame−width/16, j is the number of macroblocks in height of a frame, j = 1 to Frame−height/16, i is the number of blocks in a macroblock, i = 1 to number of blocks in macroblock, $DCT1_{k,j,i}$ and $DCT2_{k,j,i}$ are DCT coefficients for the specified macroblock and block for a previous and a current video frame, respectively, and ABS is an absolute value function.

Method two, in contrast to method one, does not discriminate between block types. Instead, method two keeps a running total of DC differences between macroblocks of current and previous video frames.

Each difference between blocks is squared and then normalized to the DCT value of the current block. Specifically, the DCT value of a block from the current video frame is subtracted from the corresponding DCT of the corresponding block in the previous video frame. The difference is then squared and divided by the corresponding DCT value of the current video frame. If the current video frame DCT value is zero, the sum for that comparison is set to one. The differences for each of the DCT values of each block in each of the macroblocks of the frames are summed together to achieve a total sum, SUM.

The SUM is next compared to predetermined thresholds. If SUM is, in this example, greater than a predetermined threshold (thresh1), where:

thresh1=0.3*$ABS(\sum_{k,j,i}DCT2_{k,j,i})$, the current video frame is saved in the frame memory for further processing and possible use in the visual index.

If SUM is less than, in this example, a predetermined threshold (thresh2), where:

thresh2=0.02*$ABS(\sum_{k,j,i}DCT2_{k,j,i})$, a static scene counter (SSctr) is increased to indicate a possible static scene. As in method one, the previous video frame is saved in a temporary memory which only saves the most previous frame. When SSctr counter reaches a predetermined number (in this example, 30), the most previous video frame saved in the temporary memory is transferred to the frame memory for possible use in the visual index.

If SUM is between the two thresholds, SSctr is reset to zero and the next consecutive frames are compared.

In accordance with the instant invention the threshold(s) is (are) varied based on the "cut rate" or the amount of action in the video. This is explained in the section below entitled: Determining The Threshold.

Method Three:

$$SUM[i] = \sum_{k,j}(DCT1_{k,j}[i] - DCT2_{k,j}[i])^2 / ABS(DCT2_{k,j})$$

where:

k is the number of macroblocks in width of a frame, k=1 to Frame-width/16, j is the number of macroblocks in height of a frame, j=1 to Frame-height/16, i is the number of blocks in a macroblock, i=1 to number of blocks in macroblock, $DCT1_{k,j}$ and $DCT2_{k,j}$ are DCT coefficients for the specified macroblock for a previous and a current video frame, respectively, and ABS is an absolute value function.

Method three like method one, differentiates between each of the blocks (four luminance and two chrominance blocks) of the macroblocks. In this method, DC values for each luminance and chrominance block in a current macroblock from the current video frame are respectively subtracted from the corresponding DC value for the corresponding block in the previous video frame. As in method two, however, each difference between blocks is squared and then normalized to the DCT value of the current block. Specifically, the DCT value of a block from the current video frame is subtracted from the corresponding DCT of the corresponding block in the previous video frame. The difference is then squared and divided by the corresponding DCT value of the current video frame. If the current video frame DCT value is zero, the sum for that comparison is set to one.

The differences for each of the DCT values of each type of block in each of the macroblocks are summed together to achieve a total sum for the type of block, SUM[i]. Separate sums of differences, SUM [i] are kept for each of the luminance and chrominance blocks in the macroblock. The sums of differences are carried forward to the next macroblock and added to the corresponding differences (SUM[1], SUM[2], . . . SUM[6]). After processing each of the macroblocks of the current video frame, a summed difference is obtained for each luminance block and each chrominance block of the current video frame. Each of the six SUMS is compared to its own upper and lower threshold specific to the type of block for which the SUM has been totaled. This method allows different threshold comparisons for each type of block.

If SUM[i] is greater than a predetermined threshold (thresh1 [i] as previously defined), the current video frame is saved in the frame memory for further processing and possible use in the visual index.

If SUM[i] is less than a predetermined threshold (thresh2 [i] as previously defined), a static scene counter (SSctr) is increased to indicate a possible static scene. The previous video frame is saved in a temporary memory which, in the present invention, saves only the most previous video frame. When SSctr reaches a predetermined number, 30, the most previous video frame saved in the temporary memory is transferred to the frame memory for possible use in the visual index. If SUM[i] is between the two thresholds, the SSctr is reset to zero and the next consecutive frames are compared. In accordance with the instant invention the threshold(s) is (are) varied based on the "cut rate" or the amount of action in the video. This is explained in the section below entitled: Determining The Threshold.

Method Four:

Methods one through three each work over the complete video frame, summing either the difference or square of the difference for the DCT values for all luminance and chrominance added together or summed as individual components. Method four works on the macroblock level providing an efficient result with limited processing.

$$SUM = \sum_{k,j} Mbdiff(MB1[i]_{k,j} - MB2[i]_{k,j})$$

where:

k is the number of macroblocks in width of a frame, k=1 to Frame-width/16, j is the number of macroblocks in height of a frame, j=1 to Frame-height/16, I is the number of blocks in a macroblock, I=1 to number of blocks in macroblock, $MB1_{k,j}$ and $MB2_{k,j}$ macroblocks for a previous and a current video frame, respectively, and Mbdiff is a function that determines the number of blocks which are different from each other between two macroblocks, and outputs a first value if this difference is higher than a certain threshold and a second value otherwise.

Specifically, a subsum (subsum[1], subsum[2], ... subsum[6]) is determined for each of the blocks (Y1, Y2, Y3, Y4, Cr and Cb) of a specific macroblock by comparing a respective block of a first macroblock to a corresponding respective block of a second macroblock to obtain a subsum [i] where:

$$\text{subsum}[i]_{j,k} = ABS(DCT1[i]_{j,k} - DCT2[i]_{j,k})$$

For example, the DC value of Cr of the first macroblock of the current frame is subtracted from the DC value of Cr of the first macroblock of the previous frame to obtain a subsum$[Cr]_{1,1}$. Each subsum[i] is compared to a predetermined threshold (th1). If the subsum[i] is, in this example, greater than a first predetermined threshold (th1), in this example, where:

$$th1=0.3*\text{subsum}[i],$$

a block counter (B1ctr) is incremented and if, lower than a second predetermined threshold (th2), where:

$$th2=0.02*\text{subsum}[i],$$

a block counter (B2 ctr) is incremented. Each respective subsum[i] is compared to the thresholds (th1 and th2) which may be a constant(s), based on a fixed function(s) or based on a function(s) or constant(s) specific to the type of block.

After the six blocks of the macroblock have been processed, the block counters are analyzed. If the block counter B1 ctr is, in this example, above a predetermined threshold (B1 th), in this example, three, the macroblock is considered different from the corresponding macroblock of the previous video frame and a macroblock counter, MB1ctr, is incremented. The B1ctr is then reset and a next macroblock is analyzed.

When all the macroblocks of a video frame have been processed, MB1ctr is compared to predetermined frame thresholds. If MB1ctr is, in this example using a 352×240 frame (or image), above a first predetermined frame threshold (f1th) of 100, the current frame is saved in the frame memory and MB1ctr is reset.

If some number of blocks in a macroblock are similar, B2ctr is above a predetermined threshold (B2th) of three, the macroblocks are considered the same and a second macroblock counter, MB2ctr, is incremented. B2ctr is then reset and a next macroblock is analyzed. After all the macroblocks of a frame have been analyzed, if the second macroblock counter is above a second predetermined frame threshold (f2th) of 250, the video frames are considered the same and a frame counter (Fctr) is set. MB2ctr is reset and a next frame is analyzed. When Fctr reaches a predetermined threshold (SSthresh, in this example, 30), a static sequence is assumed to have occurred. The previous video frame is then saved in frame memory to represent the static sequence. This process continues until a video frame is determined to be different from the previous video frame or new frames are exhausted. Fctr is then reset and the next video frame is analyzed.

Those frames saved in frame memory in this and the preceding methods are considered keyframes.

Method four could also be implemented by using the normalized square of the differences. Specifically, instead of just using the difference between blocks, the difference would be squared and divided by the values found in the subtracted block. Scene cut detection may then be less sensitive to thresholds.

Keyframe filtering, discussed below, may be performed as each frame is processed under the significant scene detection process or after all the frames have been processed. Additionally, the thresholds set forth above may easily be altered to provide lesser or greater detection. For example, in 0.3 could easily be altered to any other value as could 0.02, or constants may be altered to allow for more or less efficiency, for example, SSctr could be different. Moreover, each threshold may instead be a constant, a fixed function, or a function variable on the type or location of the block being analyzed.

In accordance with the instant invention the threshold(s) is (are) varied based on the "cut rate" or the amount of action in the video. This is explained in the section below entitled: Determining The Threshold.

Determining the Threshold

Figure 8:
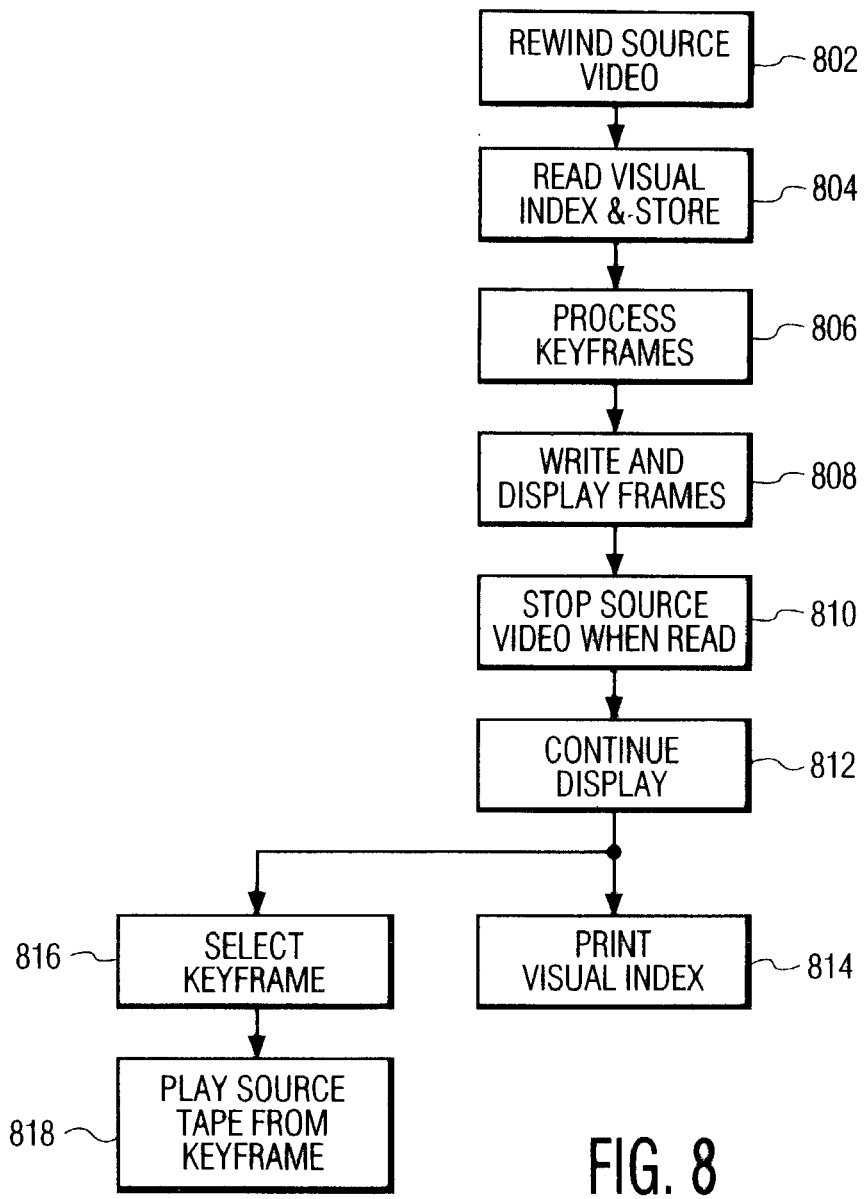
FIG. 8 illustrates a video retrieval process.
Figure 8A:
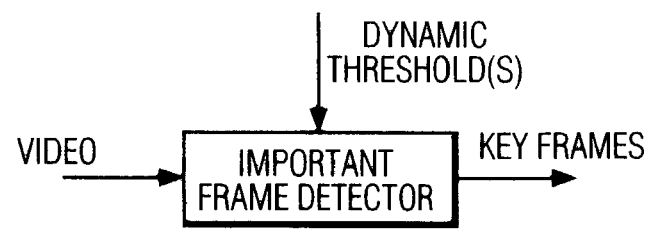
FIG. 8a illustrates a video keyframe system.
Figure 9:
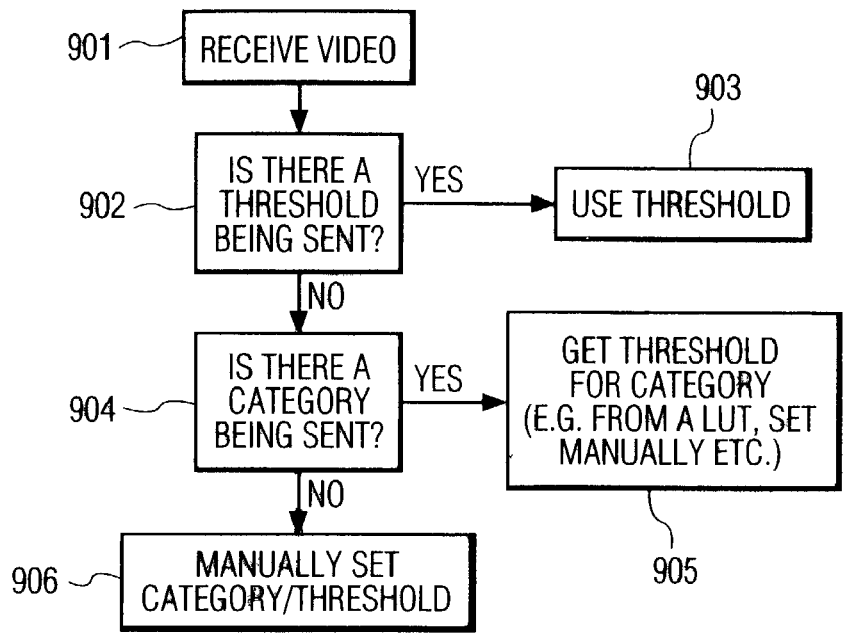
FIG. 9 illustrates a threshold detecting device.

As stated above, detecting where a scene cut in the video occurs is based on how much change occurs between two frames. The amount of change is measured against at least one threshold and if the change is above this threshold a determination is made that a scene change or "cut" has occurred. If the amount of change is below this threshold, a determination is made that a scene change or "cut" has not occurred. For an action movie, many times there are large differences between two frames, but a scene change has not occurred, such as a car chase scene or when an object flys through the air. Similarly in a static type of program for instance, a news broadcast which has a small box in the top right_corner of the frame showing the news story, if the top right hand corner of the frame changes from one news story to another, this_small change is a scene change. Therefore there is a need for the threshold to be varied in dependence on the category of the program or movie. FIG. 8a shows a video archival system which uses dynamic thresholds to determine scene changes. FIG. 9 shows a flow chart of a threshold setter which sets the threshold based on the category of the movie and compares the difference found between two frames to this threshold.

In FIG. 9 the video is received (901) and the video stream is analyzed to determine whether a threshold has been sent along with the video stream (902). If the threshold is sent, the difference between two frames (903) is compared to the threshold_to determine if a scene cut has occurred. If there is no threshold in the video stream then the video stream is analyzed to determine whether a category of the video (action, drama etc.) is being sent with the video stream (904). If a category is being sent, then a threshold is used that corresponds to this category (905). If a category is not being sent then the category and/or threshold is set manually at the receiver (906) based on the user's knowledge of the type of video being received. A video index is then made using the manually set threshold to detect cuts_or key frames. The term "category" defines, for instance, the movie type, e.g. drama, sports, action etc., or the type of any subportions of the video e.g. high action scenes or content or static scenes or content etc.

If an index is to be made of the action movie, the threshold(s) to detect scene cuts should be set higher than if an index is to be made of the static type of broadcast.

Alternatively for a more static movie, e.g. a drama, the threshold to detect static scenes should be set lower than what would be used in an action movie. Accordingly the invention pertains to adjusting the threshold based on the category of the video. For a high action video the threshold for a scene change is set high, whereas for a news broadcast the threshold for a scene change is set lower. This varying of the threshold avoids creating a large video index for the action movie and a small video index for the news broadcast.

The thresholds for a particular video or a portion of a video can be placed in the header of the received video. Alternatively the thresholds can be sent by a third party source such as with the electronic programming guides, either for each program or for subportions of a program. By varying the threshold within a movie, it takes into account a movie which is generally a low action drama but contains high action scenes. It also avoids creating a video index which contains many high action frames and few low action frames even though there may be scene changes occurring between the low action frames and no scene changes occurring between the high action frames. A third party service could also provide the thresholds in a lookup table and transmit the thresholds to the receiver with the incoming video, provide the thresholds in the receiver itself or download the thresholds_to the receiver. In any of these cases the received video (901) can be compared to the thresholds as the thresholds are received dynamically (902, 1003) or as they are stored in memory (902, 1003.)

There are also many other ways the thresholds can be received, set or used which would be obvious to one skilled in the art. For example, for home movies, or movies that the user knows the content, the user can set the threshold himself. This would enable the user to create a personalized video index of home movies.

It should also be noted that the threshold could be set very high for commercials, so that many keyframes aren't selected from the commercials.

The category of the video or portions of the video could be set by the movie maker and provided within the video stream. The receiver could also store various thresholds and select a threshold based on the category of the received video. (See FIG. 9.)

Figure 10:
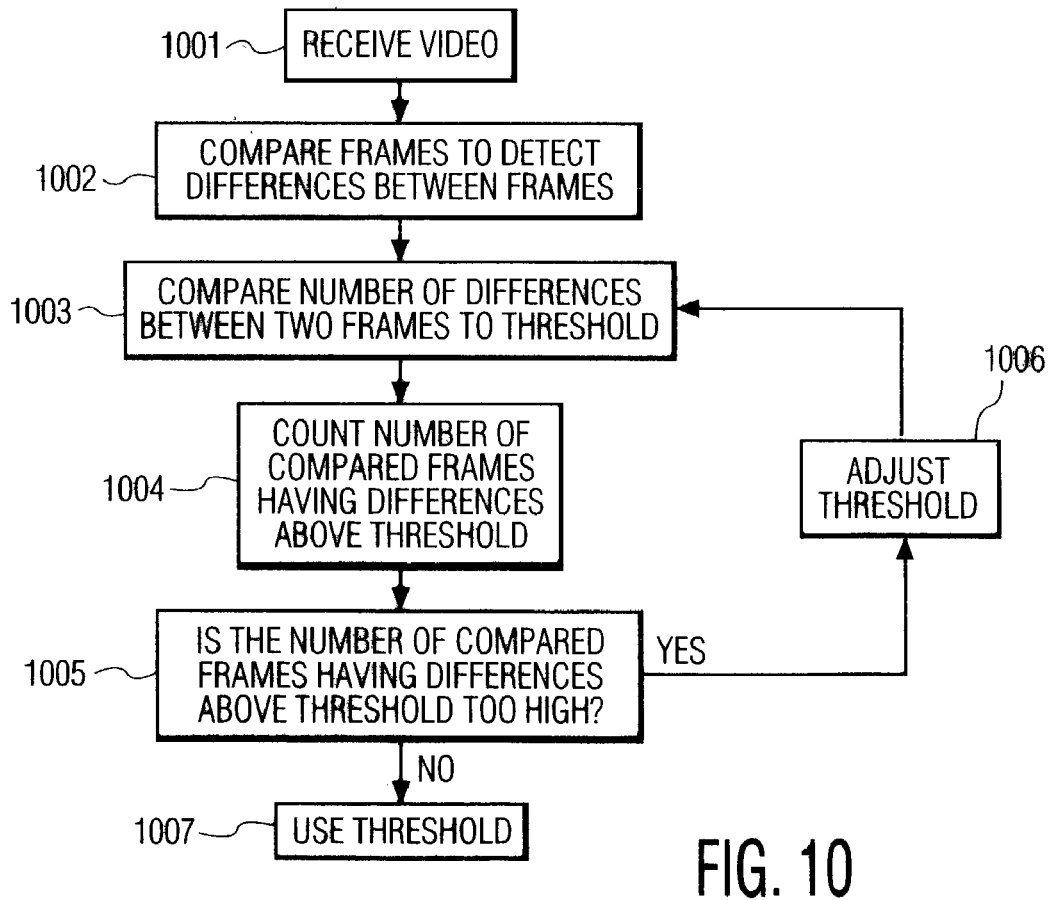
FIG. 10 illustrates a threshold setting device.

Alternatively the video indexing system could set the threshold based on the perceived content of the video determined from the movie itself (FIG. 10). To determine the threshold(s) to be used for a movie or video, or portions thereof, a universal threshold is first chosen to select key frames from the video. If the number of detected scene changes (cuts) using the universal threshold is above a certain amount (1003,1004,1005), the threshold is set higher (1006) until a reasonable number of scene changes are detected. (See FIG. 10.)

In FIG. 10, the video is received (1001) and two frames are compared to detect the number of differences between the two frames (1002). The number of differences is then compared to the universal threshold to see if a "cut" has occurred between the two frames (1003). The detected cuts are then counted (1004). If the number of detected cuts is too high for creation of a reasonably sized video index (1005) the universal threshold is adjusted (1006) so that fewer cuts will be perceived as occurring. Once the number of detected cuts is within a reasonable range (which_depends on the size of the video index that is being created) then this threshold is used (1007) to create a video index.

Keyframe Filtering. A keyframe filtering method can also be used to reduce the number of keyframes saved in frame memory by filtering out repetitive frames and other selected types of frames. Keyframe filtering is performed by a keyframe filterer 240 in the host processor 210 after significant scene detection (FIGS. 2A and 2B). During the significant scene detection process, a large number of keyframes (frames or images selected) may be extracted, for example, 2000 keyframes per hour of recorded video which is often too many to be easily handled by a user. However, from a user=s perspective, not all the keyframes selected in the significant scene detection are important or necessary to convey visual contents of the video. For example, in a dialogue scene, speakers are likely shown several times. The present invention allows retention of only one frame per speaker for the dialogue scene.

Figure 6A:
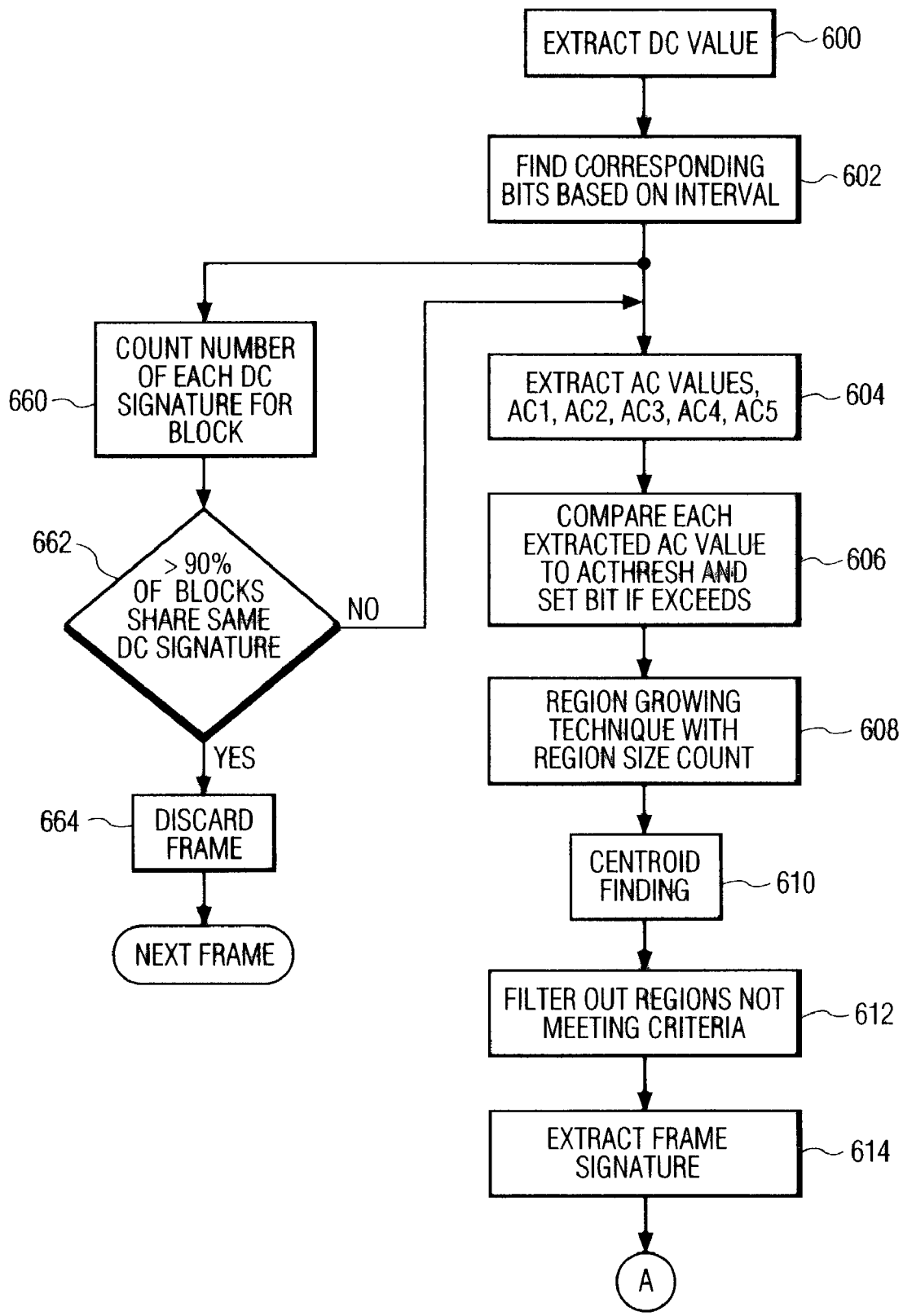
FIGS. 6A and 6B illustrate a procedure for keyframe filtering.
Figure 6B:
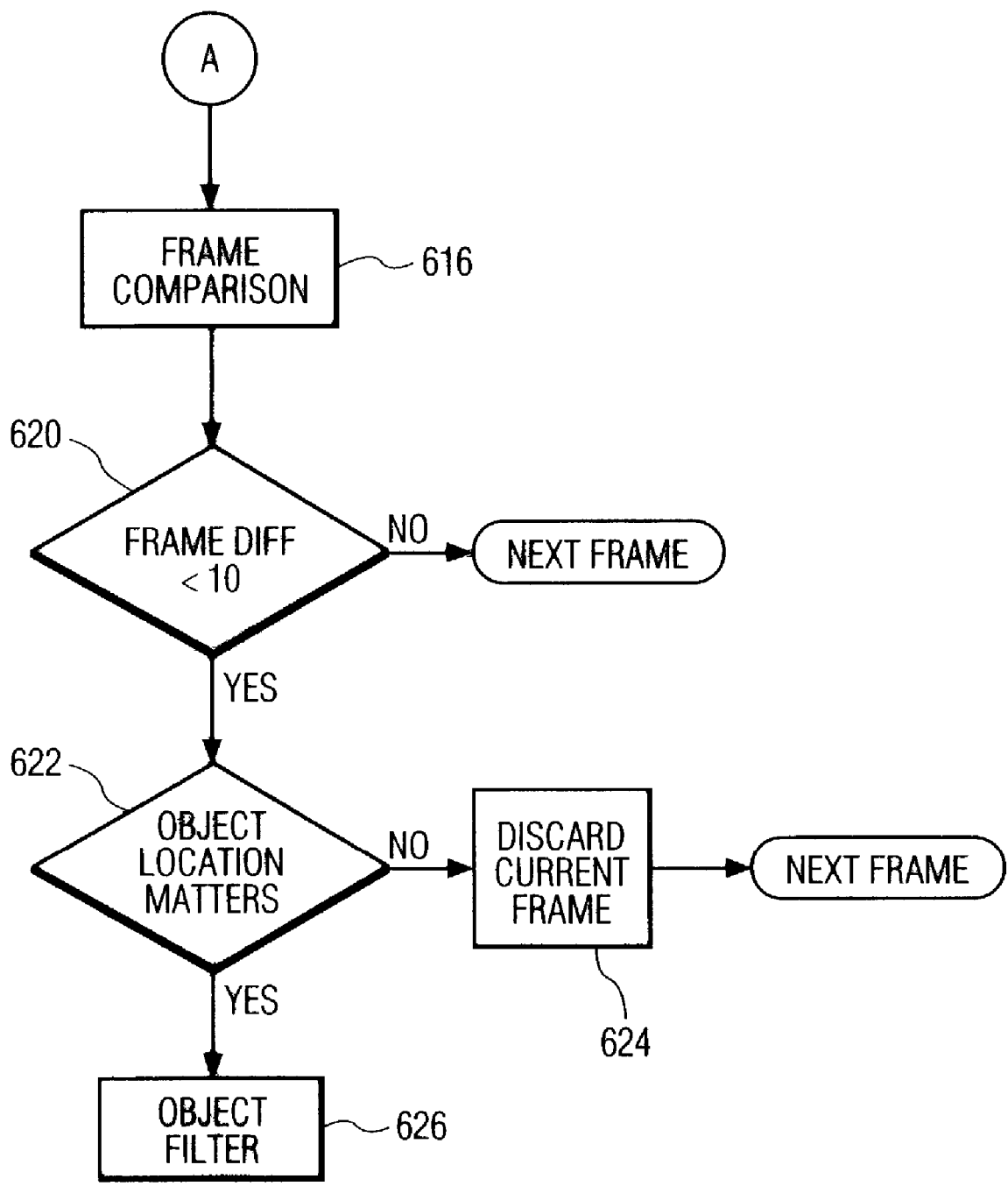
Figure 7:
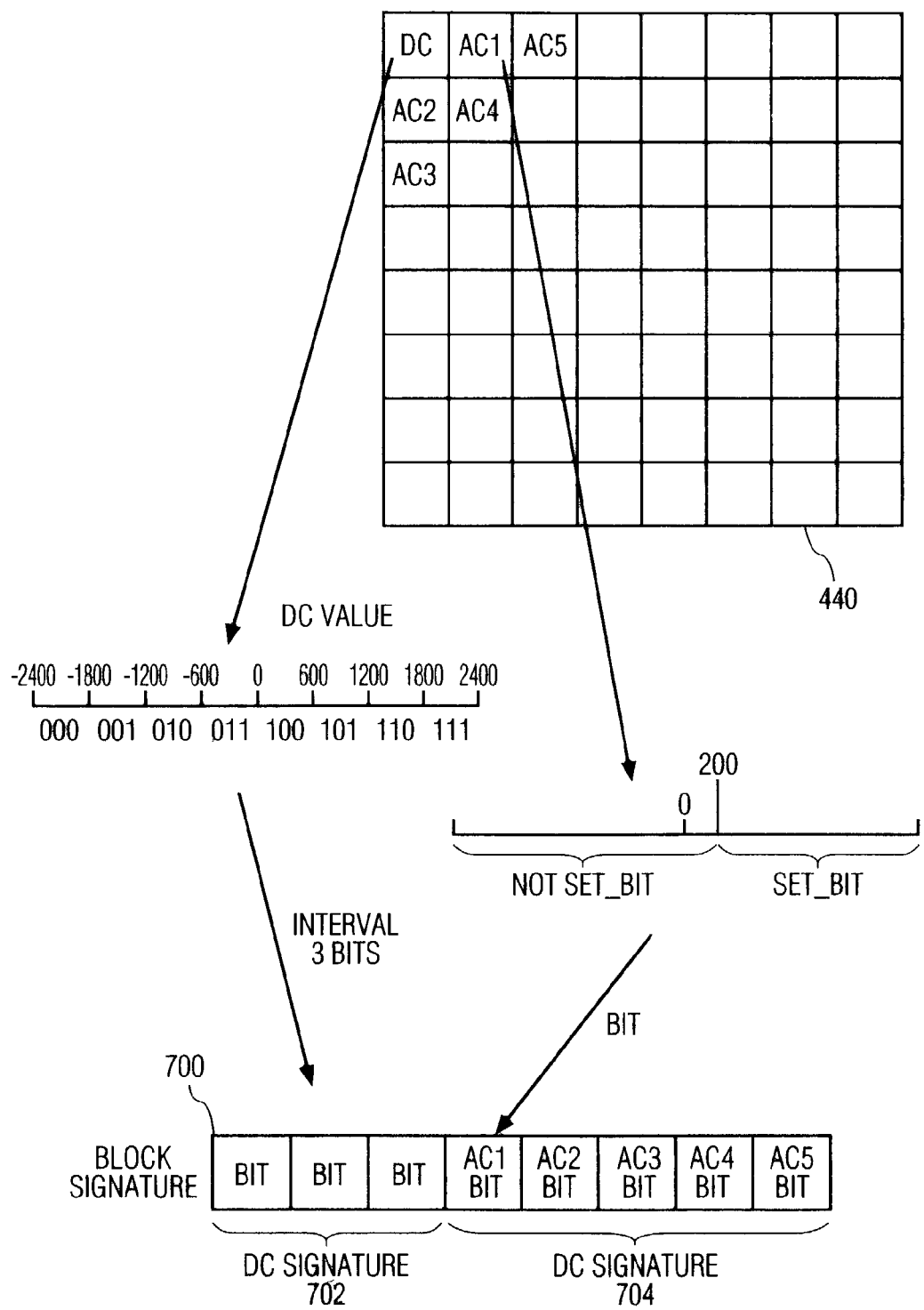
FIG. 7 is illustrates a macroblock and its relationship to a block signature.

FIGS. 6A and 6B are an overview of the procedure for keyframe filtering. As shown in steps 602 to 606 of FIG. 6A, a block signature is derived for each block in a frame. The block signature 700 is, in this example, eight bits, three of which represent a DC signature 702 and five of which represent an AC signature 704, as shown in FIG. 7. All other DCT coefficients in a block besides the DC value are AC values.

The DC signature is derived by extracting the DC value (step 602) and determining where the DC value falls within a specified range of values (step 604), in this example, between −2400 and 2400. The range is divided into a preselected number of intervals as shown in FIG. 7. In the present invention, eight intervals are used, although more or less intervals may be used for greater or lesser granularity of an image which can also be set by the category of the movie.

Each interval is assigned a predefined mapping such as that shown in FIG. 7. Each DC value is compared to the range and the mapping for the interval into which the DC value falls is returned. The value represented by the bits needed corresponds to the number of intervals. In this example, since the range is divided into eight intervals, three bits are used. As shown in FIG. 7, the block signature 700 will thus include the DC signature 702 as the first three bits and the AC signature 704 as the remaining five bits. The number of bits allocated to the DC signature or the AC signature can also be set based on the category of the movie.

In step 604 of FIG. 6A, to give good representation of a range of AC values for the block, the five AC values closest to the DC values (A1–A5) are extracted, as shown in FIG. 7. In step 606, each of the five AC values is compared to a threshold (ACthresh), in this example, 200 and if the AC value is >ACthresh, a corresponding bit in the AC signature 706 is set to a predetermined value such as one, and if < or = to ACthresh, the corresponding bit is set to zero. The ACthresh can also be based on the category of the video.

The block signature 700 is thus obtained and using the block signatures, specific images or frames may be filtered out from the visual index, such as frames which are unicolor.

A quick method to filter out unicolor frames occurs between steps 602 and 604, relying only on the DC signature. Each DC signature 704 is compared and a count is kept of each specific DC signature which occurs, (step 660) i.e., each DC signature represents into which interval the DC value falls, so in this example, eight different DC signatures exist). If, for example, 90% of the blocks or 1782 blocks (0.9 * 330 macroblocks * 6 blocks) fall in the same interval (have the same DC signature), the image is considered unicolor (step 662) and the frame is discarded or filtered out from frame memory (step 664). Alternatively, separate counts could be kept for each type of block (Cr, Cb . . . ) and each separate count compared to an associated threshold which can be based on the category of the movie.

After deriving the block signatures (Blk_sig) for each block of each macroblock in the frame, regions are determined. Regions are, in this example, two or more blocks, each block of which neighbors at least one other block in the region and which shares a similar block signature to the other blocks in the region. More blocks could be required to define a region if timing is desired to be decreased. Although each block signature of the frame could be compared to each other block signature and then counted to determine regions, the present invention may use a known technique such as a region growing process to determine regions within a frame (step 608).

During the region growing process, a region counter is kept for each region to count the number of blocks in a region (size), and is represented by 16 bits. Once the entire frame has been analyzed to find the regions, another known method may be used to find a centroid or center of each region, which, in this example, is based on an x-y axis reference (step 610). Both the x and y coordinates are extracted as CX and CY, respectively, and are represented by 16 bits. Each region is then assigned a region signature, Region(Blk_sigr, sizer, CXr, CYr) where r is a region number. The block signature for the region is determined based on a most dominant block signature as determined by the region growing process.

Based on specific criteria, in the present example, increasing size, the regions are sorted and region filtering may be performed (step 612). In this example, all but the largest three regions are filtered out. The remaining three regions are incorporated into a frame signature representing the frame. The frame signature, in the present example, is represented by 168 bits and of the form (Region1, Region2, Region3) or more specifically, (Blk_sig1, size1, CX1, CY1, Blk_sig2, size2, CX2, CY2, Blk_sig3, size3, CX3, CY3). The number of bits in the frame signature can be set by the category of the video which would also change the number of regions based on the category of the video.

As shown in FIG. 6B, a frame comparison procedure compares a current (F2) and a previous (F1) frame based on their respective frame signatures (step 616). In the present example, the respective Region1s are compared, then the respective Region2s and lastly, the respective Region3s. Specifically, the block signatures of respective regions are compared according to the following:

$$FDiff=ABS(size1_{F1}-size1_{F2})+ABS(size2_{F1}-size2_{F2})+ABS(size3_{F1}-size3_{F2})$$

If FDiff is <10, the frames are considered similar and further object processing is performed (step 620). If FDiff is ⊒10, the frames are considered different and neither frame is filtered under this procedure. Clearly what Fdiff is compared to can also be set by the category of the video.

Regions generally represent an "object" which may be an object, person, thing, etc. Object processing determines if an object shown in a region in a previous frame is in a same location or in very close proximity. In the present example, the object is a primary focus of the frame or one of the more primary focuses. For example, a video may focus on a child playing with a ball, where the ball moves about within the frame. If a user wants to limit the number of frames in the visual index such that she does not care where the object is within an image (step 622), then at this juncture, F2, the current frame, is filtered out of frame memory (step 624).

If a user cares where an object is within a frame and wishes to filter only frames having an object shown in a same or very close proximity, several methods may be used (object filter, step 626).

A first method compares centers by determining their Euclidean distances, as shown below. Specifically, $$Edist=SQRT[(CX1_{F1}-CX1_{F1})^2+(CY1_{F1}-CY1_{F1})^2]+\\SQRT[(CX2_{F1}CX2_{F1})^2+(CY2_{F1}-CY2_{F1})^2]+\\SQRT[(CX3_{F1}-CX3_{F1})^2+(CY3_{F1}-CY3_{F1})^2]$$

If Edist is >3, the object is assumed to have moved and no filtering is performed. If Edist is < or = to 3, the object is assumed to have remained in approximately the same position and thus, the current frame is filtered out. Edist can also be compared to a number based on the category of the video.

A second method for object filtering compares frames using macroblocks. Specifically, block signatures of respective blocks within respective macroblocks are compared. For example, the block signature of the Y1 block of MB1, 1 (macroblock in position 1,1 of a frame) of a current frame (F2) is compared to the block signature of the Y1 block of MB1, 1 of a previous frame (F1).

First, the DC signature of the Y1 blocks are compared. If the DC signatures match, the AC signatures are compared, bit by bit. A count (ACcount) is kept and if a preselected number of bits match, in the present example, four of five bits, a block counter (BlkCTR) is incremented. If the DC signatures do not match, or if the ACcount is <4, then the next block is analyzed. ACcount can be compared to a number based on the category of the video.

Each block of the macroblock (in this example using 4:2:0, six blocks) is analyzed. When all the blocks in a macroblock are analyzed, the block counter is checked. If BlkCTR is ⊒4, then the blocks are deemed similar and a macroblock counter (MBCTR) is increased. BlkCTR can also be compared to a number based on the category of the video.

Once all the macroblocks in an image have been analyzed, MBCTR is checked. If MBCTR is, in this example, > or = to 75% (247 or 0.75 * 330 macroblocks) of the macroblocks in a frame, the frames are deemed similar and the current frame (F2) is filtered out from the frame memory. If MBCTR is <75%, then no frames are filtered at this point. Again the MBCTR can be compared to a percentage which is based on the category of the video.

An additional method for filtering out unicolor frames occurs when the region sizes are determined. If a region size is ⊒90% of the frame blocks or 1782 blocks, the frame is deemed to be unicolor and is filtered from frame memory. This filtering requires more processing than the previous unicolor frame filtering method discussed. Again the 90% can be varied based on the category of the video.

Based on the keyframe signature, keyframes are filtered out to retain only those most likely to be desired by a user. By using different thresholds, the number of keyframes filtered out may be increased or decreased.

In the keyframe filtering process, the presence of commercials in the source video can generally be determined. The present invention allows the user to choose whether to include keyframes from the commercials as part of the visual index or instead, exclude those keyframes.

Presence of commercials is generally indicated by a high number of cuts per time unit. However, action movies may also have prolonged scenes with a large number of keyframes per time unit. To have more reliable isolation of commercials, a total distribution of the keyframes in the source video is analyzed to attempt to deduce a frequency and a likelihood of segments with commercials.

Commercials are typically spread over fixed intervals during television programs, for example, every five to ten minutes during a sitcom of 30 minutes. Duration of commercials is typically 1–2 minutes. Commercials are isolated by determining when a high number of keyframes per minute occurs. Specifically, relative times of each keyframe are compared to other keyframes. If a relatively high number of keyframes per minute occur, the threshold could be set to a high number for this area to avoid taking too many keyframes from the commercials or high action sequences.

During the significant scene detection process, when a frame is saved in frame memory as a keyframe, an associated frame number is converted into a time code or time stamp, indicating, for example, its relative time of occurrence. After every keyframe is extracted, a keyframe density is computed for the last one minute where:

$L1$=Last minute keyframe density=number of keyframes in the last minute/1800, and a keyframe density is computed for the last five minutes where:

$L5$=Last five minute keyframe density=number of keyframes in the last five minutes/9000.

If $L1 > (L2 * \text{constant})$, where constant is 3 in this example, then a potential commercial break is indicated. If a time stamp of the last keyframe of the last indicated commercial break is >5 minutes, then a current commercial break is indicated and all the keyframes in the last one minute are filtered from frame memory. The filtering technique could be achieved by simply setting the threshold to a high value during this time period to avoid taking keyframes of commercials.

Video Retrieval: Once a video tape or file has a visual index, a user may wish to access the visual index. A video retrieval process displays the visual index to the user in a useable form. The user can browse and navigate through the visual index and fast forward to a selected point on the source tape or the MPEG file. FIG. 8 details the retrieval process.

In step 802, the source video is rewound by, for example, a VCR or playback device, if required, to the location of the visual index, in this example, at the beginning of the tape. If the source video is on an MPEG file or disk, a pointer would point to the beginning of the storage location and would not need to be rewound. Similarly, other storage means would be properly set to the beginning of the visual index.

In step 804, the visual index is read by the VCR head, computer, or other hardware device from the source video and saved into an index memory which can be any type of storage device. In step 806, a processor in, for example, the VCR retrieves keyframes from an index memory of the source video. In step 806, the retrieved keyframes are processed to reduce size to, in this example, 120×80 pixels, although other frame sizes may easily be chosen automatically or manually by a user.

The processed frames are next transferred to the host processor 210 in step 808 which writes the processed keyframes to display memory and displays them in a user interface such as a computer display, television screen, etc.

In step 810, the source video is stopped once the video index has been read. A video indexing system or software allows keyframes to be displayed on a display, such as a computer monitor or television screen in step 812. In step 814, the visual index may be printed if the user desires. A user may also select a particular keyframe from the visual index as shown in step 816. If a user wishes to view the source video at that particular keyframe, the source tape could then be automatically forwarded to a corresponding point on the source tape from where the keyframe was extracted and the source tape could thus be played (step 818). Alternatively, a counter could be displayed allowing a user to either fast forward through the source video or play the source video from the visual index to the selected key frame.

The present invention may also eliminate the significant scene detection processing and perform only keyframe filtering; however, processing would be significantly slower using currently and widely available processors.

An additional feature would allow a user to stop the playing of a video tape at any point and access the visual index for that video tape. This would require a memory or buffer for storing the visual index when a video tape is first used during a session.

The present invention is shown using DCT coefficients; however, one may instead use representative values such as wavelength coefficients or a function which operates on a sub-area of the image to give representative values for that sub-area. This may be used in significant scene detection as well as keyframe filtering.

While the invention has been described in connection with preferred embodiments, it will be understood that modifications thereof within the principles outlined above will be evident to those skilled in the art and thus, the invention is not limited to the preferred embodiments but is intended to encompass such modifications.

What is claimed is:

1. A video system, comprising:
   a receiver which receives frames of video;
   a threshold memory which receives a threshold for a particular category of the video, wherein the threshold is based on an amount of action typically found in the particular category, the threshold being received from a program guide; and
   a comparator which compares a first frame to a subsequent frame to determine a difference between the first and subsequent frames and compares the difference to the threshold, wherein if the difference is greater than the threshold then a scene change is deemed to have occurred between the two frames, and wherein if the difference is lower than the threshold then a scene change is deemed not to have occurred.

2. The video system in accordance with claim 1, wherein if the difference is lower than the threshold for a plurality of frames the scene is deemed a static scene.

3. The video system in accordance with claim 1, wherein the threshold is set at the receiver.

4. The video system in accordance with claim 1, further comprising:
   a category detector for detecting the category of the video; and
   a threshold setter for setting the threshold based on the category detected.

5. The video system as claimed in claim 1, wherein the threshold is automatically changed if a number of detected scene changes is above a predetermined number.

6. The video system as claimed in claim 1, wherein the threshold is automatically changed if a number of detected scene changes is below a predetermined number.

7. The video system of claim 1, further comprising a keyframe filterer which receives key frames from each scene change and filters out at least one of i) redundant, ii) similar and iii) unicolor key frames.

* * * * *